Oct. 28, 1941.   C. A. CAMPBELL   2,260,435
LUBRICATED PISTON FOR FLUID PRESSURE BRAKES
Filed June 4, 1940
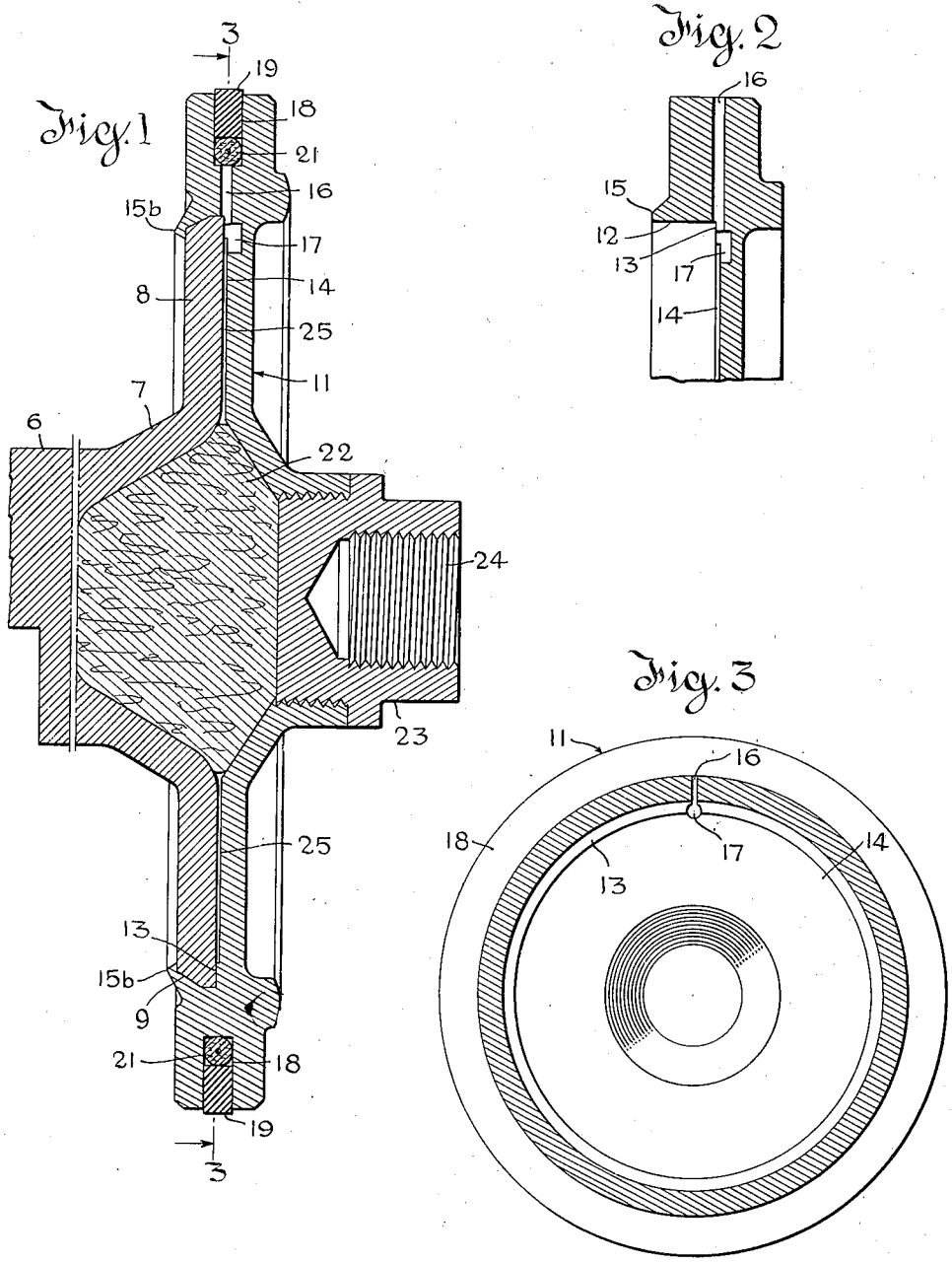
Inventor
Charles A. Campbell
By
Attorneys Patented Oct. 28, 1941

2,260,435

UNITED STATES PATENT OFFICE 2,260,435

LUBRICATED PISTON FOR FLUID PRESSURE BRAKES

Charles A. Campbell, Watertown, N. Y., assignor to The New York Air Brake Company, a corporation of New Jersey Application June 4, 1940, Serial No. 338,797

8 Claims. (Cl. 184—18)

This invention relates to fluid pressure brakes and particularly to self-lubricating pistons for triple valves and like devices, and was developed particularly for use in the service piston and emergency piston of the A—B valve, now standard for freight braking on American railroads.

The three year valve-cleaning interval made possible by the extensive use of air filters in air brake systems has created a need for a piston lubricator operative through a similar interval. The space available for oil storage is so limited as to be adequate only if the oil is economically fed. The rate of feed must be minute and still proportionate to the activity of the valve, for over feeding causes gumming and faulty action. The oil charge must be protected against dissipation if the car be inverted as hopper cars frequently are when handling coal and ore. These requirements are difficult to meet in a simple compact device of reasonable manufacturing cost.

Reasonably satisfactory lubrication has been attained by the use of breather type lubricators, such as those of my prior Patent 2,151,008, March 21, 1939, in which air was caused to surge to and from an oil reservoir as an incident to pressure changes in the brake system. The surge port in devices of this type has usually been associated with the piston ring groove, or near thereto. The prior art lubricators were unduly expensive to manufacture, and as a rule their rate of feed of oil did not vary in close enough relation to the activity of the valve.

The present invention relates to the breather type of lubricator and combines simplicity of construction with greatly improved feeding characteristics as the result of a novel coordination of the form and dimensions of the breather passage.

A reservoir with a surrounding annular zone of capillary thickness and considerable radial extent is produced by flanging a forged piston head onto a flanged cup-like hub formed integrally with the piston shank. The capillary interval is preserved and its thickness is closely controlled by counterboring from a peripheral shoulder against which is seated the periphery of the flange in the cup-like hub.

From the ring groove of the piston head a breather port leads to the outer periphery of the capillary zone, a slight enlargement being formed at the junction. The reservoir is filled with loosely packed oil saturated gauze which holds in its meshes the entire oil charge. Since the gauze extends to the inner margin of the capillary zone, oil feeds from the gauze to the capillary interval and a minute quantity is always present at the junction enlargement ready to be picked up by the breathing air and carried to the ring groove. Leakage between the side of the ring and its groove permits sufficient breathing flow. By using a deep groove, it becomes possible to place an absorbent chenille underlay beneath the ring and this improves oil distribution.

A commercial embodiment which has demonstrated desirable operating characteristics is illustrated in the accompanying drawing and will be described by reference thereto.

Fig. 1 is an axial section through the piston with the gauze packing, the ring underlay and the ring in place.

Fig. 2 is a fragmentary axial section through the piston head, ready to be flanged onto the shank. At this stage the breather port has been drilled but the ring groove has not been cut.

Fig. 3 is a section on the line 3—3 of Fig. 1 with the gauze packing, the ring underlay and the ring omitted.

A portion of the piston shank is shown at 6 and terminates in a flared cupped hub portion 7 which has a wide flat peripheral flange 8. The outer margin of the flange is beveled, as indicated at 9. The piston head indicated generally in Fig. 1 by the numeral 11 has, before mounting, the form shown in Fig. 2; that is to say, it is bored at 12 to a shoulder 13 which surrounds a counterbored portion 14 some 0.003" deeper.

There is a beveled rim 15 at the entrance to the bore 12. A radial breather port 16 is drilled through the rim of the piston rod to cut into the shoulder 13 and the shoulder 13 is there milled or profiled away to form a small cylindrical chamber 17 to which the drilled port leads.

With the head in the form just described, the flange 8 is pressed into the bore 12 until flange 8 seats at its outer margin on shoulder 13. This is a forced fit. Then the flange 15 is rolled or pressed down, as indicated at 15b in Fig. 1, producing an oil-tight interlock.

After the head has been attached to the shank, as above described, the periphery of the piston is machined to final form and the ring groove 18 is cut. The location of the ring groove is such that the drilled port 16 leads from its bottom. The piston ring 19 is then applied. I prefer to use a ring groove deep enough to receive an absorbent wire-cored chenille wick or underlay 21 which, when used, encircles the bottom of the groove beneath the ring 19.

The piston head has its flat counterbore area 14 opposed to the flat flange portion 8 of the shank, thus forming a capillary zone 25 of accurately controlled thickness (say 0.003 inch) and considerable radial extent surrounding the reservoir in the hub 7. Opposite the hub 7 the head 11 has an offset which adds to the volume of the hub chamber. This offset is formed with a central filling portion threaded to receive the closure plug 23. The internal threads 24 in the plug are designed to receive a "piston puller" which is a tool used in servicing operations.

The capillary zone 25 communicates with the small chamber 17, as does the drilled port 16. Pistons of the type under discussion are used with their axes horizontal, and the port 16 and chamber 17 should be near the top, but any point in the top 60° of angle will give satisfactory operation. This is important in two respects. It reduces the precision required in assembling the head to the shank with consequent saving both in labor cost and rejections. It permits the port to be located so as to accommodate any special design features affecting the piston rim.

The chamber in the hub is filled with oil saturated fibrous material 22. Surgeons' gauze is an ideal material and has been used in a strip an inch wide and some ten feet long stuffed into the reservoir and, alternatively, has been used in clippings about one inch square.

The quantity of oil should be sufficient to completely saturate the gauze, but an excess of free oil should be avoided. Its presence is not fatal to operation, but since feed control is based on capillary effects, an excess of oil tends to impair the accuracy of feed and, if the excess is considerable, there may be undesirable over feed when a car is inverted. This last is believed to be the most serious objection.

The gauze delivers oil by capillary flow to the capillary zone 25, and this gradually becomes, and tends to remain, oil filled so that oil is always available at the chamber 17, where it is readily picked up by the breathing air.

The oil feed is minute and is intensified by increased activity of the valve. No considerable quantity of oil will drain from the capillary zone, even if the car be inverted.

While particular forms and dimensions have been stated for purpose of explanation, these are illustrative and not limiting. For example, the connection of breather port 16 to the bottom of the ring groove is preferred because it is effective and imposes no limits on the design of the piston rim. However, prior art breather ports have led from the piston rim beside and clear of the ring groove, and have been cut into the outer side of the ring groove, and both these arrangements have been used together. While they are considered inferior, and while they impose undesirable limitations on design, the feed control exercised by the capillary zone 25 is effective in a useful degree irrespective of the type of breather port used. Hence, except as specified in the claims, limitation to the particular breather port is not intended.

Similarly, the form and dimensions of the chamber 17 are subject to variation, and though an enlarged space at the junction of port 16 and capillary zone 25 is considered to improve performance, adequate communication from port 16 to zone 25 is the vital thing and can be had in various specifically different ways.

The important consideration seems to be that the capillary interval 25 be thin enough to assure a strong capillary action, sufficient to keep the interval normally filled with oil and to refill promptly any portion of the interval from which oil is displaced by air flow or breathing.

It is impossible to state specific dimensional limitations because the volume of the central chamber and the rate and degree of pressure change both enter as factors determining the rate of flow of air through the capillary interval. This interval, though thin, extends completely around the piston so that the available total effective air flow area is larger than the area of port 16. Hence the rate of air flow through the interval is slow and the flow is localized near the top.

Tests show that the device will feed at a controlled rate and over a long period. That the theory of capillary action is correct is demonstrated by the fact that when the total content of oil becomes so low that the gauze 22 competes with the capillary interval 25 for oil, the rate of oil feed drops. From this it is apparent that the action of the device is dependent on the presence of a capillary film of oil in the interval 25. The fact that a portion of the capillary interval 25 is below the gauze filled chamber, so that gravity favors the feed of oil thereto, is believed to be a contributing factor to the success of the device. Whenever oil enters any part of the interval 25 there is a strong tendency for it to spread throughout the entire interval.

What is claimed is:

1. The combination with a self-lubricating air brake valve piston of the type having an oil reservoir, and a breather passage between said reservoir and the periphery of the piston for permitting oil conveying air surges to and from said reservoir, of oil feed controlling means comprising a chamber of capillary thickness and substantial width and length forming an intermediate portion of said breather passage, said chamber being thin enough to ensure persistent capillary entry of oil and of sufficient total cross-sectional area to prevent the breathing air from sweeping it free of oil.

2. The combination with a self-lubricating air brake valve piston of the type which is mounted in a substantially vertical plane and has a central reservoir filled with oil absorbing and dispersing material, and a breather passage between the reservoir and the periphery of the piston near the top thereof for permitting oil conveying air surges to and from said reservoir, of oil feed controlling means comprising an annular chamber of capillary thickness and substantial radial extent surrounding said reservoir and forming an intermediate portion of said breather passage, said chamber being thin enough to ensure persistent capillary entry of oil and of sufficient total cross-sectional area to prevent the breathing air from sweeping it free of oil.

3. A self-lubricating piston for use in fluid pressure brake valves and the like comprising in combination a piston head formed with a peripheral ring groove, an internal chamber communicating with a space of capillary thickness and substantial length and width leading toward the rim of the piston and a restricted breather passage connecting the ring groove and capillary space; a piston ring in said groove; and oil absorbing and dispersing fibrous material in said chamber extending to the said capillary space to feed oil thereto, said capillary space being thin enough to ensure capillary entry of oil and of sufficient total cross-sectional area to prevent the breathing air from sweeping it free of oil.

4. A self-lubricating piston for use in fluid pressure brake valves and the like comprising in combination a piston head formed with a peripheral ring groove, an internal chamber communicating with a space of capillary thickness and substantial length and width leading toward the rim of the piston and a restricted breather passage connecting the ring groove and capillary space; a piston ring in said groove; an absorbent underlay in said groove beneath said ring; and oil absorbing and dispersing fibrous material in said chamber extending to the said capillary space to feed oil thereto, said capillary space being thin enough to ensure capillary entry of oil and of sufficient total cross-sectional area to prevent the breathing air from sweeping it free of oil.

5. A self-lubricating piston for use in fluid pressure brake valves and the like comprising in combination a piston head formed with a peripheral ring groove, an approximately central internal chamber communicating with an encircling space of capillary thickness and substantial radial extent, and a restricted breather passage connecting the ring groove and the outer margin of the capillary space; a piston ring in said groove; and oil absorbing and dispersing fibrous material in said chamber and extending to the inner margin of said capillary space, said encircling space being thin enough to ensure capillary entry of oil and of sufficient total cross-sectional area to prevent the breathing air from sweeping it free of oil.

6. A self-lubricating piston for use in fluid pressure brake valves and the like comprising in combination a piston head formed with a peripheral ring groove, an approximately central internal chamber communicating with an encircling space of capillary thickness and substantial radial extent, and a restricted breather passage connecting the ring groove and the outer margin of the capillary space, there being at the junction of the breather passage and capillary space a chamber whose transverse dimensions exceed those of the breather passage and the thickness of the capillary space; a piston ring in said groove; and oil absorbing and dispersing fibrous material in said chamber and extending to the inner margin of said capillary space, said encircling space being thin enough to ensure capillary entry of oil and of sufficient total cross-sectional area to prevent the breathing air from sweeping it free of oil.

7. In a breather type lubricator for air-brake valve devices, means forming a zone of capillary thickness and of sufficient area to retain by capillary action a charge of oil which exceeds the quantity to be delivered by a breathing pressure surge; means for supplying oil to said zone; means forming a chamber communicating with said zone near its top; and a breather port connecting said chamber and a part to be lubricated, said port being subject to pressure surges in said valve device.

8. In a breather type lubricator for pistons having a ring groove and a ring, the combination with a piston of the type stated of means forming within the piston an approximately vertical zone of capillary thickness and of such area as to retain by capillary action a charge of oil in excess of that fed by a single breather surge; means for supplying oil to said zone below the top thereof; means forming a chamber communicating with said zone near the top thereof; and a breather port connecting said chamber and the ring groove of the piston.

CHARLES A. CAMPBELL.